United States Patent
Parmentier

[11] 3,724,277
[45] Apr. 3, 1973

[54] RESILIENT INSTRUMENT CARRYING CASE

[76] Inventor: Jean Rene Parmentier, 7, rue Leonard de Vinci, Paris, France

[22] Filed: Mar. 22, 1971

[21] Appl. No.: 126,558

[30] Foreign Application Priority Data

Apr. 9, 1970 France..................................7012813

[52] U.S. Cl..................73/431, 244/148, 248/358 R
[51] Int. Cl.........................G01d 11/10, G01d 11/24
[58] Field of Search .73/430, 431; 244/148; 324/156; 248/358 R, 27; 33/225 R

[56] References Cited

UNITED STATES PATENTS

| | | | |
|---|---|---|---|
| 2,798,686 | 7/1957 | Ehrlich | 324/156 |
| 2,904,617 | 9/1959 | King | 248/27 UX |
| 2,132,168 | 10/1938 | Klein et al. | 33/225 R |
| 3,599,910 | 8/1971 | Wipft | 248/27 |
| 3,026,072 | 3/1962 | Hughes | 73/431 X |
| 3,227,992 | 1/1966 | Strong | 248/27 X |
| 2,833,898 | 5/1958 | De Lisse | 248/358 R X |

*Primary Examiner*—S. Clement Swisher
*Assistant Examiner*—Daniel M. Yasich
*Attorney*—Young & Thompson

[57] ABSTRACT

A case or enclosure enclosing at least one instrument which is protected against shocks by a body of neoprene or the like elastomer. The elastomer body is provided with a recess the shape and size of which match those of the instrument embedded within said recess, preferably open at both ends. Such cases are intended for use by parachutists or else for laboratory purposes or again on vehicle instrument boards.

5 Claims, 3 Drawing Figures

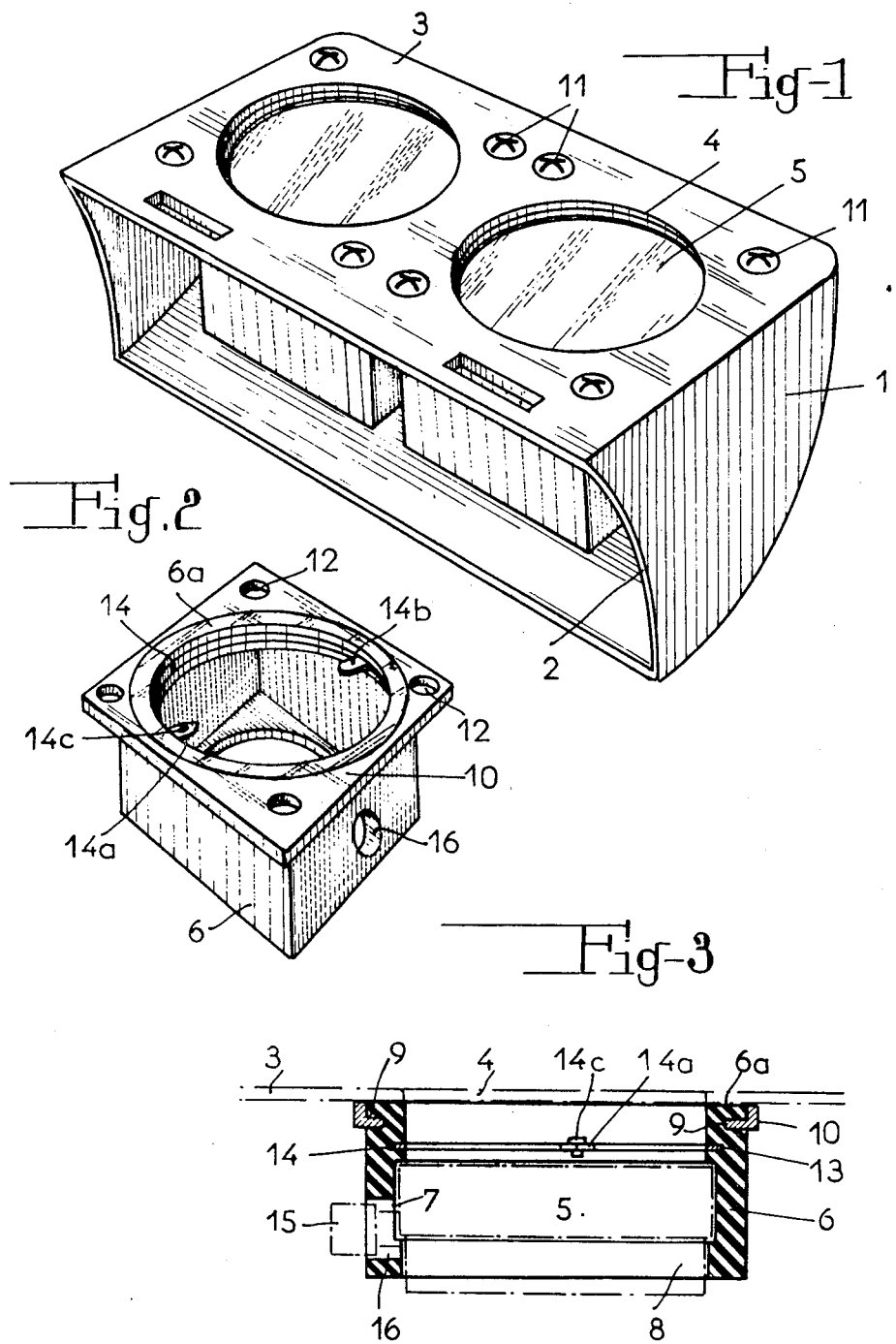

RESILIENT INSTRUMENT CARRYING CASE

Various instruments are liable to be subjected to shocks. This is the case in particular for the altimeters and stop-watches to be used by parachutists, so that they may readily ascertain at any moment their altitude and the time elapsed. When their parachute opens, an instantaneous and harsh deceleration is transmitted to the instrument case and this is again true, upon landing. Shocks may also be imparted to the case during transportation by air or by land, both prior to starting and when returning after landing. If the instruments are rigidly secured to their case, such shocks may damage them.

My invention has for its object an improvement to the instruments to be carried by an instrument case with a view to removing such drawbacks.

According to my invention, the instrument is embedded inside a body of an elastomeric material provided with a recess the size and shape of which match those of the instrument, said body being held fast inside the case.

According to a preferred embodiment of the invention, the elastomeric body is open at both ends and is provided with an inner annular groove adapted to engage and hold the instrument in position. Said body may also be provided, above the level of said inner groove with an outer annular groove inside which is fitted a rib or flange forming part of an annulus or plate secured to the case. The elastomeric body may also by provided above the first mentioned inner groove with a second inner groove inside which a marking ring is fitted.

If the case is to carry several instruments, each of the latter is advantageously embedded inside its own elastomeric body.

My invention is applicable not only to parachutists equipment, but also to the instrument boards of aircraft and automobiles and also to laboratory equipment.

There is described hereinafter by way of example and in a non-limiting sense an embodiment of an instrument case for parachutists incorporating my invention, reference being made to the accompanying drawing wherein:

FIG. 1 is a perspective view of the case enclosing two instruments.

FIG. 2 is a perspective view of the body adapted to carry one instrument.

FIG. 3 is a transverse sectional view of said body.

My improved equipment includes as illustrated a case 1 the rear wall 2 of which is incurved, so that it may match the shape of a parachute on the wearer's stomach, while its cover 3 is provided with apertures 4 through which the parachutist can examine the dials of the indicating instruments 5.

Each instrument 5 is fitted inside a body 6 made of a molded elastomer such as neoprene. Said body is illustrated as being outwardly of a substantially parallelopipedic shape and has an internal groove or recess 7, the size of which corresponds to that of the instrument 5. Its top is open and its bottom is open at 8, so as to afford means for introducing the instrument inside the body.

The body 6 is provided furthermore with an outer peripheral groove 9 inside which is housed a flange formed on an L-shaped plate 10. Said plate the opening in which surrounds the body 6 may be secured by means of screws 11 engaging holes 12 tapped in the plate 10, to the inner surface of the case cover 3. When inoperative, the outer upper lip 6a of the body 6 projects beyond the plate 10, consequently, when said plate is introduced into the case 1, this upper lip 6a, is clamped between the plate 10 and the cover 5 of the case whereby the elastomeric body is rigidly secured to the plate and consequently to the case.

Lastly, the body 6 is provided above the groove 7 with a further internal groove 13 inside which is inserted a ring 14 carrying an inwardly directed lug 14b. The lug 14b extends over the dial of the instrument 5 and may thus be brought into registry with any desired subdivision of the dial scale, through an angular shifting of the ring 14. A reference mark 14a also rigid with the ring 14 extends similarly over the instrument dial and may carry a fluorescent dot 14c.

If the instrument 5 carries laterally a control knob 15, the body 6 may be provided with an opening 16 affording a passage for such a knob, while one of the walls of the case 1, say its front wall, has a corresponding opening allowing operation of the knob.

The preceding disclosure shows that the instrument 5 is perfectly protected against shocks by elastomer while its dial and control knob are recessed with reference to the outer surface of the case and are consequently protected against the impact of any objects what may hit the case 1 during the fall of the parachutist.

Obviously, the invention is by no means limited to the embodiment disclosed and illustrated and it covers all the modifications thereof falling within the scope of the accompanying claims.

What I claim is:

1. In combination with a case enclosing at least one instrument, a body of an elastomer held fast within the case, said body having an annular recess therein whose size and shape match those of the instrument to embed the periphery of the latter within said body, the instrument having a dial and a peripheral rib, said body of the elastomer comprising a ring carrying reference marks, the body having the annular recess and a groove facing the instrument located therein, the instrument fitted inside the recess with said peripheral rib engaging said recess and said ring being angularly adjustable around the dial in the groove.

2. An instrument case as claimed in claim 1, wherein the body has openings therein, one of which allows inspection of the instrument and the other the insertion of the latter inside the body, the body having said recess to engage and hold the instrument in position.

3. An instrument case as claimed in claim 2, comprising a plate, the case having a top, means securing the plate to the case top, surrounding one of said openings in the body and said plate including a depending inwardly bent flange portion, the elastomeric body having a peripheral groove therein engaged by said bent flange portion.

4. An instrument case as claimed in claim 2, comprising a plate, the case having a top, means securing the plate to the case top, surrounding one of said openings in the body and said plate including a depending inwardly bent flange portion, the elastomeric body having a peripheral groove engaged by said bent flange portion, the upper edge of the body above said peripheral groove and projecting above the plate when the latter in not fitted to the case top.

5. An instrument case as claimed in claim 1, adapted to carry two said instruments, wherein two elastomeric bodies are juxtaposed and held fast inside the case and have recesses in which the peripheries of the corresponding instruments are embedded.

* * * * *